(12) United States Patent
Candelore et al.

(10) Patent No.: US 8,452,010 B2
(45) Date of Patent: *May 28, 2013

(54) VIDEO SLICE AND ACTIVE REGION BASED MULTIPLE PARTIAL ENCRYPTION

(75) Inventors: Brant L. Candelore, Escondido, CA (US); Henry Derovanessian, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/216,615

(22) Filed: Aug. 24, 2011

(65) Prior Publication Data

US 2012/0002809 A1 Jan. 5, 2012

Related U.S. Application Data

(60) Continuation of application No. 12/069,259, filed on Feb. 8, 2008, now Pat. No. 8,027,469, which is a division of application No. 10/273,905, filed on Oct. 18, 2002, now Pat. No. 7,376,233, which is a continuation-in-part of application No. 10/038,217, filed on Jan. 2, 2002, now Pat. No. 7,336,787, and a continuation-in-part of application No. 10/038,032, filed on Jan. 2, 2002, now Pat. No. 7,139,398, and a continuation-in-part of application No. 10/037,914, filed on Jan. 2, 2002, now Pat. No. 7,124,303, and a continuation-in-part of application No. 10/037,499, filed on Jan. 2, 2002, now Pat. No. 7,151,831, and a continuation-in-part of application No. 10/037,498, filed on Jan. 2, 2002, now Pat. No. 7,127,619.

(60) Provisional application No. 60/351,828, filed on Jan. 24, 2002, provisional application No. 60/370,427, filed on Apr. 4, 2002, provisional application No. 60/355,326, filed on Feb. 8, 2002, provisional application No. 60/409,675, filed on Sep. 9, 2002.

(51) Int. Cl.
*H04N 7/167* (2011.01)

(52) U.S. Cl.
USPC .......................................................... 380/210

(58) Field of Classification Search
USPC ............ 380/201, 202, 210, 228, 238; 715/31; 713/160; 725/31
See application file for complete search history.

(56) References Cited

U.S. PATENT DOCUMENTS 5,805,700 A * 9/1998 Nardone et al. ............... 380/217
5,926,624 A 7/1999 Katz et al.
(Continued)

FOREIGN PATENT DOCUMENTS

JP 09-251714 9/1997

OTHER PUBLICATIONS

Bungum, O.W., "Transmultiplexing, Transcontrol and Transscrambling of MPEG-2/DVB Signal," International Broadcasting Convention, Conference Publication No. 428, pp. 288-293, Sep. 1996.

(Continued)

*Primary Examiner* — Beemnet Dada
(74) *Attorney, Agent, or Firm* — Miller Patent Services; Jerry A. Miller

(57) ABSTRACT

A television set-top box has a receiver receiving a digital television signal comprising: a plurality of unencrypted packets and a plurality of encrypted packets, where the encrypted packets carry data describing an active region of a video frame. A decrypter decrypts the encrypted packets. A decoder decrypted packets to produce a signal suitable for play on a television set. This abstract is not to be considered limiting since other embodiments can include more, fewer or different features than those described in this abstract.

27 Claims, 12 Drawing Sheets

U.S. PATENT DOCUMENTS

| | | | |
|---|---|---|---|
| 6,148,205 | A | 11/2000 | Cotton |
| 6,314,188 | B1 | 11/2001 | Ishibashi |
| 6,735,311 | B1 | 5/2004 | Rump et al. |
| 6,922,785 | B1 | 7/2005 | Brewer et al. |
| 2002/0150239 | A1* | 10/2002 | Carny et al. .......... 380/37 |
| 2003/0079133 | A1 | 4/2003 | Breiter et al. |
| 2004/0003281 | A1 | 1/2004 | Sonoda et al. |
| 2004/0078338 | A1 | 4/2004 | Ohta et al. |
| 2005/0172127 | A1 | 8/2005 | Hartung et al. |
| 2005/0228752 | A1 | 10/2005 | Konetski et al. |
| 2005/0271205 | A1 | 12/2005 | Shen et al. |
| 2006/0036554 | A1 | 2/2006 | Schrock et al. |
| 2007/0100701 | A1 | 5/2007 | Boccon-Gibod et al. |

OTHER PUBLICATIONS

Parviainen, Roland and Parnes, Peter, "Large Scale Distributed Watermarking of Multicast Media Through Encryption," 2001.

All references cited in the parent application, allowed U.S. Appl. No. 12/069,259, filed Feb. 8, 2008.

* cited by examiner

| | | | ... | | |
|---|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

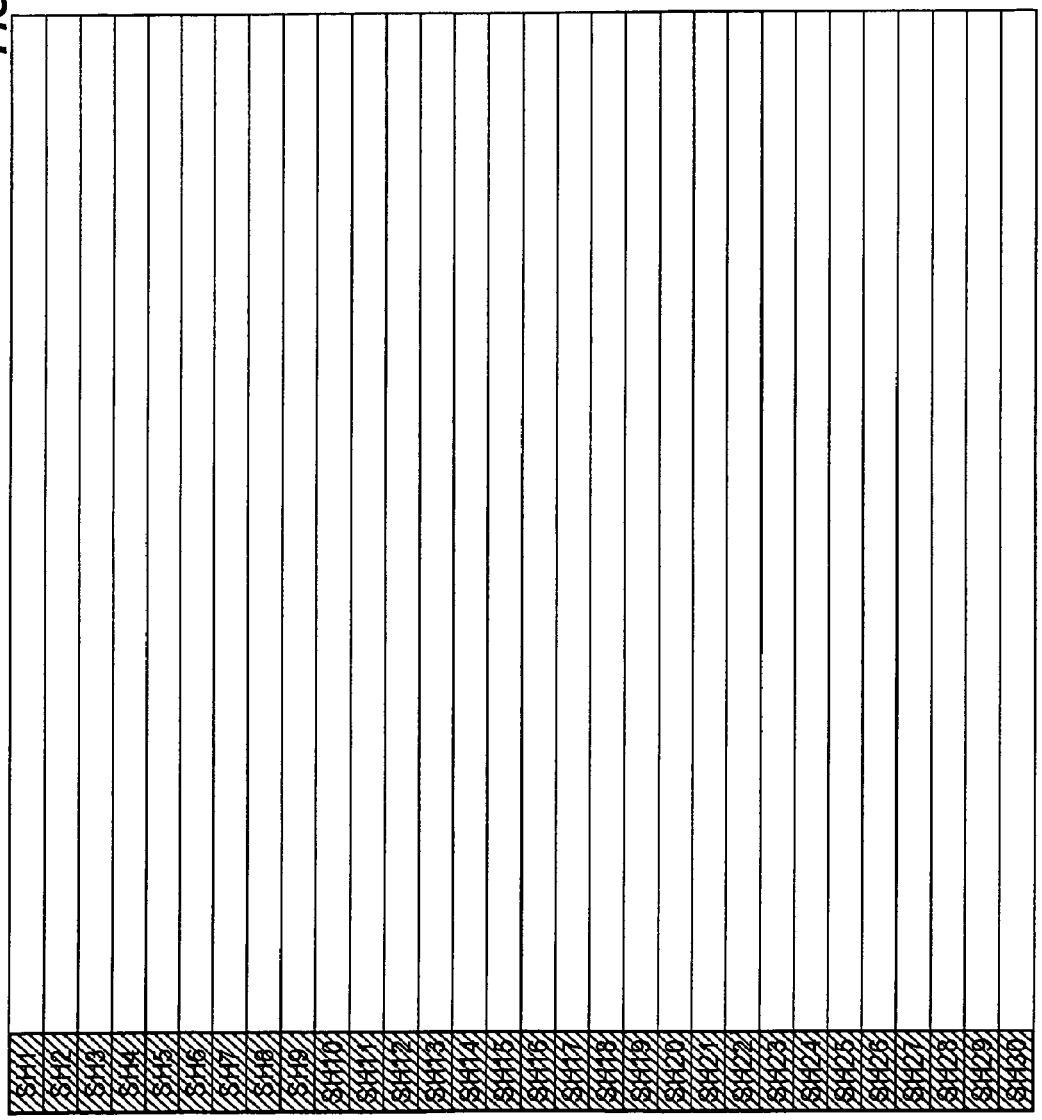

| | | | ... | | |
|---|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

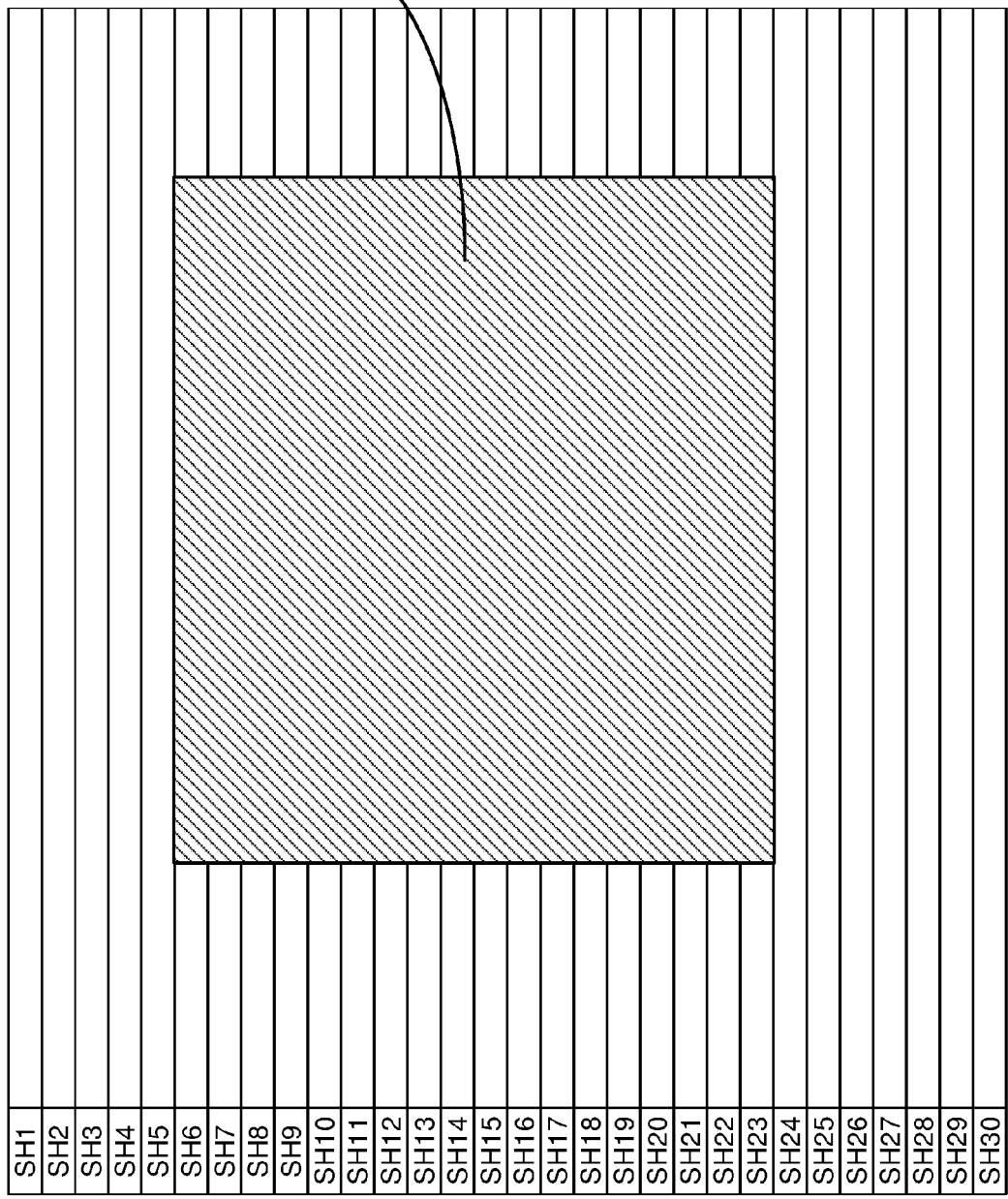

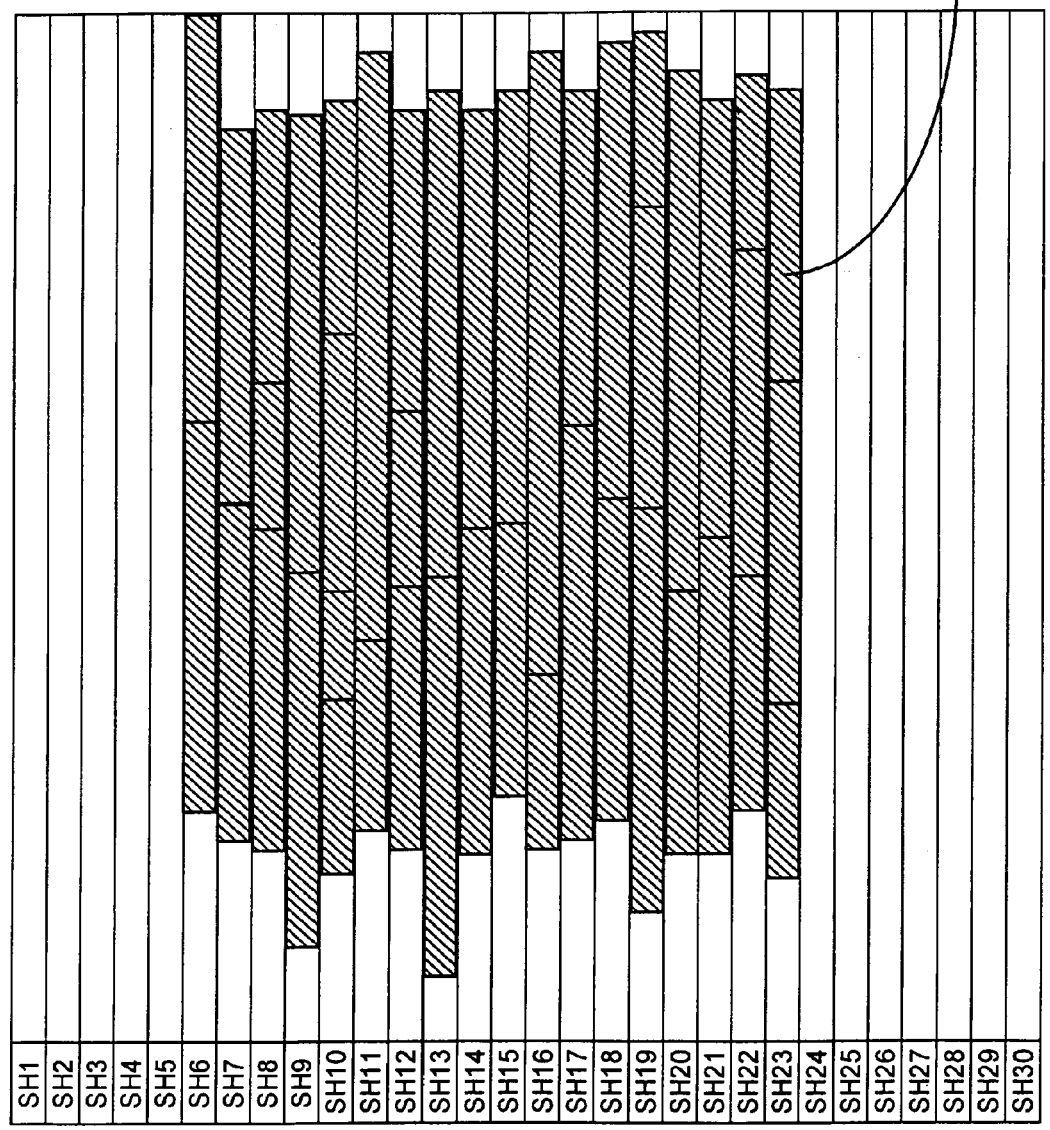

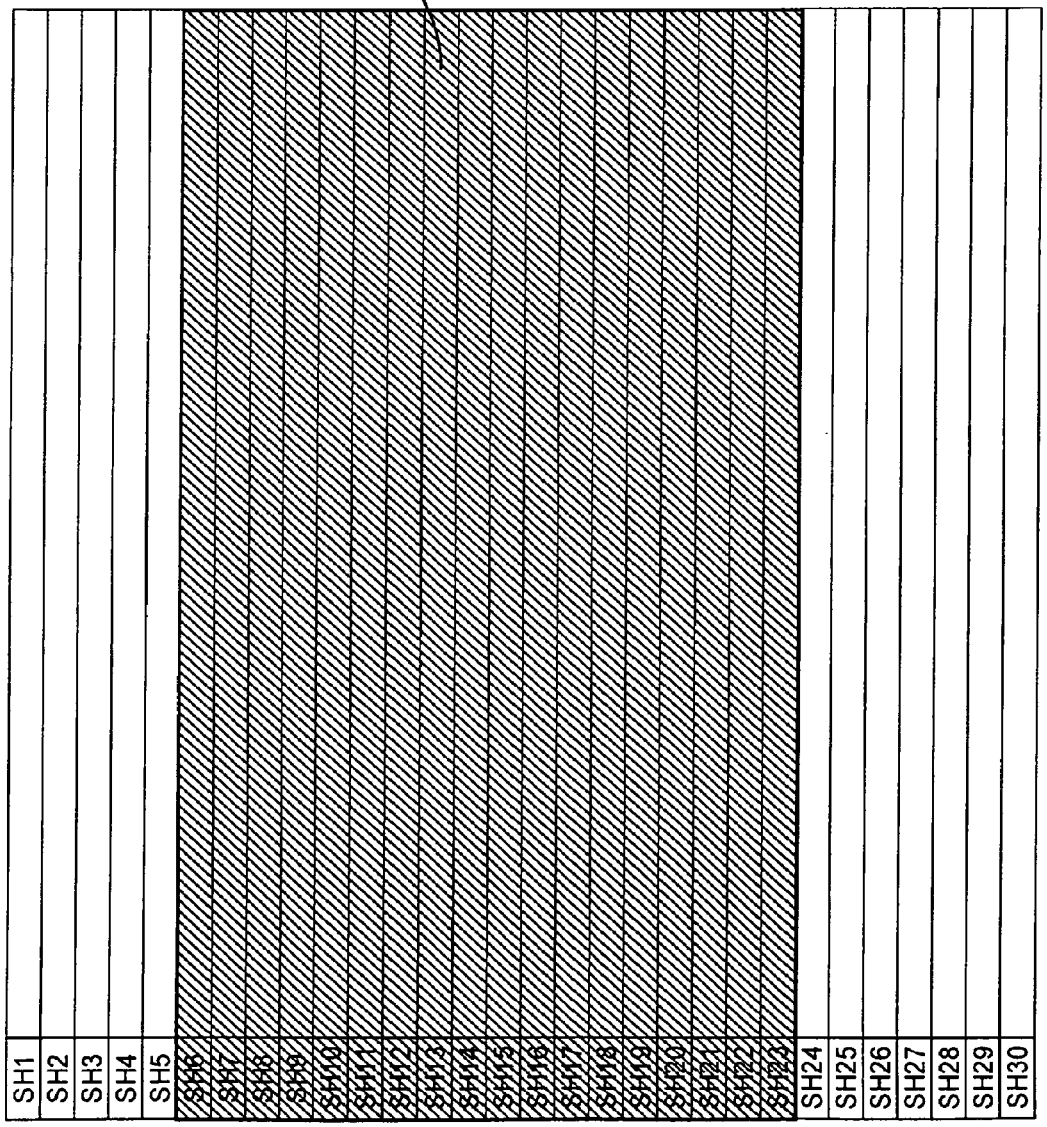

US 8,452,010 B2

VIDEO SLICE AND ACTIVE REGION BASED MULTIPLE PARTIAL ENCRYPTION

CROSS REFERENCE TO RELATED DOCUMENTS

This application is a continuation of U.S. patent application Ser. No. 12/069,259 filed Feb. 8, 2008 now U.S. Pat. No. 8,027,469 which is a divisional of U.S. application Ser. No. 10/273,905 filed Oct. 18, 2002 now U.S. Pat. No. 7,376,233, which is a continuation-in-part of patent application Ser. No. 10/038,217, now U.S. Pat. No. 7,336,787, entitled "Critical Packet Partial Encryption" to Unger et al.; patent application Ser. No. 10/038,032, now U.S. Pat. No. 7,139,398 entitled "Time Division Partial Encryption" to Candelore et al.; patent application Ser. No. 10/037,914, now U.S. Pat. No. 7,124,303 entitled "Elementary Stream Partial Encryption" to Candelore; patent application Ser. No. 10/037,499 now U.S. Pat. No. 7,151,831 entitled "Partial Encryption and PID Mapping" to Unger et al.; and patent application Ser. No. 10/037,498, now U.S. Pat. No. 7,127,619 entitled "Decoding and Decrypting of Partially Encrypted Information" to Unger et al., all of which were filed on Jan. 2, 2002 and are hereby incorporated by reference herein.

This application is also related to and claims priority benefit of U.S. Provisional patent application Ser. No. 60/351,828 filed Jan. 24, 2002, entitled Method for Partially Scrambling Content by Encrypting Selective Slice Headers and Preliminary Macroblock Information" to Candelore; U.S. Provisional patent application Ser. No. 60/370,427 filed Apr. 4, 2002, entitled "Method for Partially Scrambling Video Content by Encrypting Macroblocks Motion Vectors" to Candelore et al.; U.S. Provisional patent application Ser. No. 60/355,326 filed Feb. 8, 2002, entitled "Analysis of Content Selection Methods", to Candelore; and U.S. Provisional patent application Ser. No. 60/409,675, filed Sep. 9, 2002, entitled "Generic PID Remapping for Content Replacement", to Candelore. These applications are also hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, this invention relates to a dual encryption method and apparatus particularly useful for encrypting packetized video content such as that provided by cable and satellite television systems.

BACKGROUND OF THE INVENTION

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5 illustrates the slice structure of a frame of video data consistent with certain embodiments of the present invention.

FIG. 6 illustrates slice header encryption consistent with certain embodiments of the present invention.

FIG. 7 illustrates slice header encryption in addition to encryption of the first macroblock in each slice consistent with certain embodiments of the present invention.

FIG. 8 illustrates active region encryption consistent with certain embodiments of the present invention.

FIG. 9 illustrates packetized active region encryption consistent with certain embodiments of the present invention.

FIG. 10 illustrates active slice encryption consistent with certain embodiments of the present invention.

DETAILED DESCRIPTION OF THE INVENTION

Figure 1:
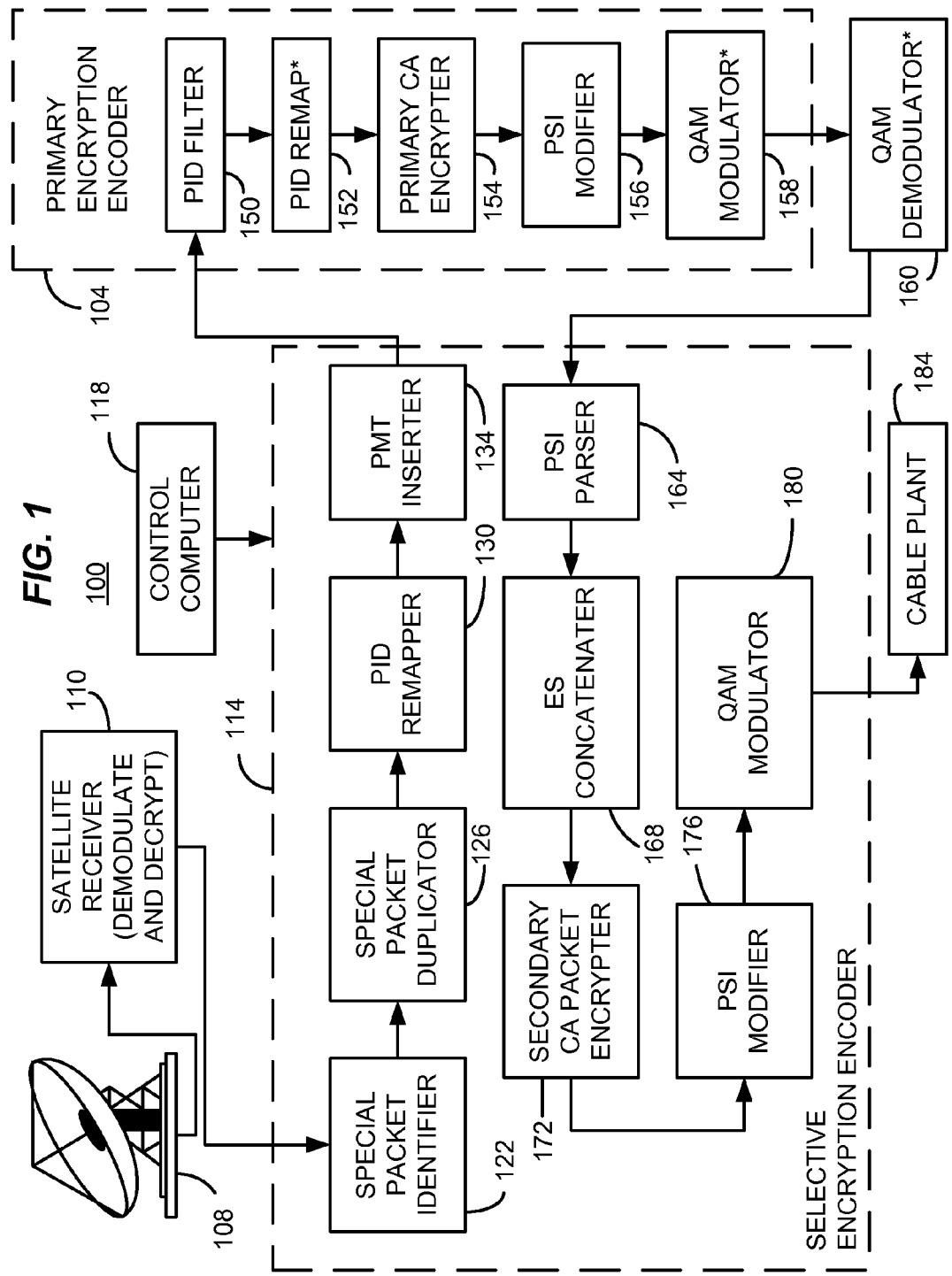
FIG. 1 is a block diagram of an exemplary cable system head end consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Turning now to FIG. 1, a head end 100 of a cable television system suitable for use in practicing a dual encryption embodiment of the present invention is illustrated. Those skilled in the art will appreciate that the present invention could also be implemented using more than two encryptions systems without departing from the present invention. The illustrated head end 100 implements the dual partial encryption scenario of the present invention by adapting the operation of a conventional encryption encoder 104 (such as those provided by Motorola, Inc. and Scientific-Atlanta, Inc., and referred to herein as the primary encryption encoder) with additional equipment.

Head end 100 receives scrambled content from one or more suppliers, for example, using a satellite dish antenna 108 that feeds a satellite receiver 110. Satellite receiver 110 operates to demodulate and descramble the incoming content and supplies the content as a stream of clear (unencrypted) data to a selective encryption encoder 114. The selective encryption encoder 114, according to certain embodiments, uses two passes or two stages of operation, to encode the stream of data. Encoder 114 utilizes a secondary conditional access system (and thus a second encryption method) in conjunction with the primary encryption encoder 104 which operates using a primary conditional access system (and thus a primary encryption method). A user selection provided via a user interface on a control computer 118 configures the selective encryption encoder 114 to operate in conjunction with either a Motorola or Scientific Atlanta cable network (or other cable or satellite network).

It is assumed, for purposes of the present embodiment of the invention, that the data from satellite receiver 110 is supplied as MPEG (Moving Pictures Expert Group) compliant packetized data. In the first stage of operation the data is passed through a Special Packet Identifier (PID) 122. Special Packet Identifier 122 identifies specific programming that is to be dual partially encrypted according to the present invention. The Special Packet Identifier 122 signals the Special Packet Duplicator 126 to duplicate special packets. The Packet Identifier (PID) Remapper 130, under control of the computer 118, remaps the PIDs of the elementary streams (ES) (i.e., audio, video, etc.) of the programming that shall remain clear and the duplicated packets to new PID values. The payload of the elementary stream packets are not altered in any way by Special Packet Identifier 122, Special Packet Duplicator 126, or PID remapper 130. This is done so that the primary encryption encoder 104 will not recognize the clear unencrypted content as content that is to be encrypted.

Figure 2:
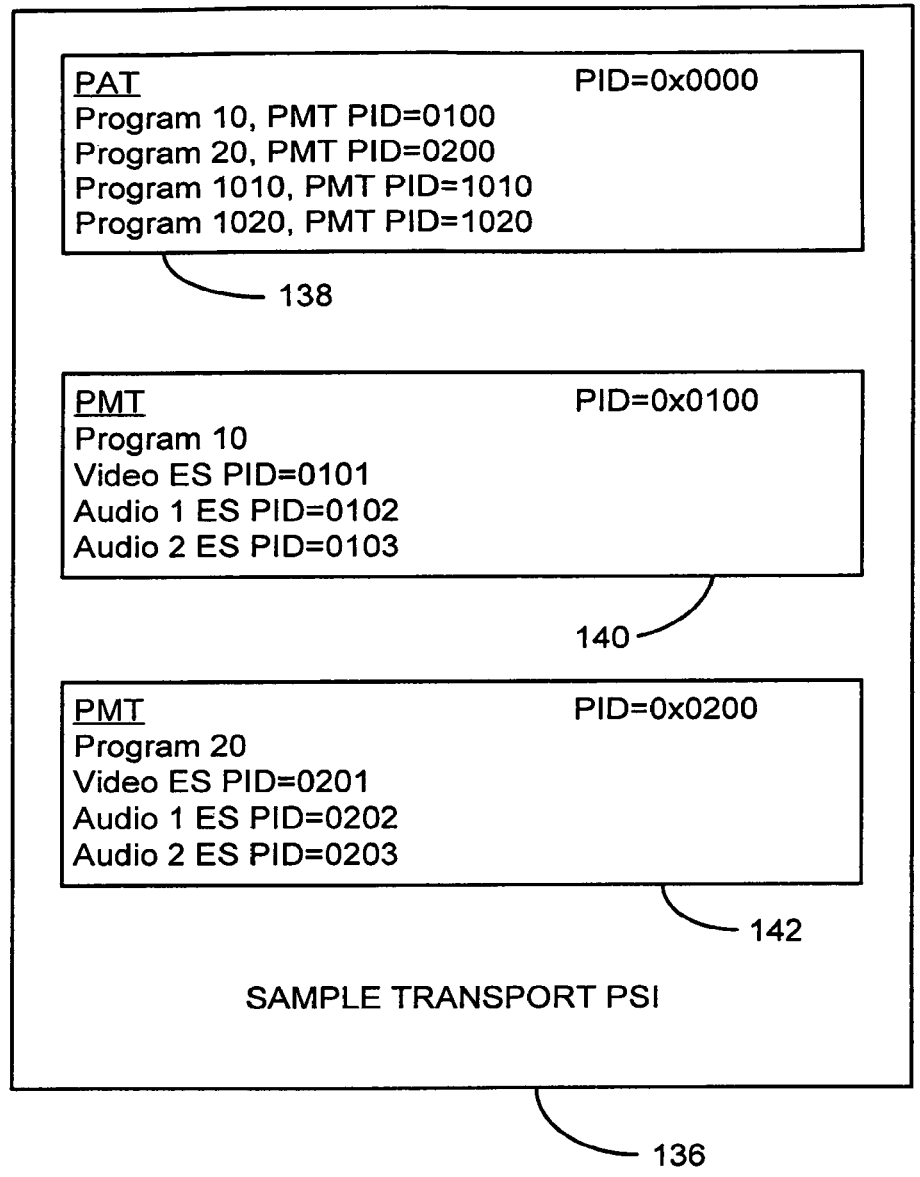
FIG. 2 is an illustration of sample transport stream PSI consistent with certain embodiments of the present invention.

The packets may be selected by the special packet identifier 122 according to one of the selection criteria described in the above-referenced applications or may use another selection criteria such as those which will be described later herein. Once these packets are identified in the packet identifier 122, packet duplicator 126 creates two copies of the packet. The first copy is identified with the original PID so that the primary encryption encoder 104 will recognize that it is to be encrypted. The second copy is identified with a new and unused PID, called a "secondary PID" (or shadow PID) by the PID Remapper 130. This secondary PID will be used later by the selective encryption encoder 114 to determine which packets are to be encrypted according to the secondary encryption method. FIG. 2 illustrates an exemplary set of transport PSI tables 136 after this remapping with a PAT 138 defining two programs (10 and 20) with respective PID values 0100 and 0200. A first PMT 140 defines a PID=0101 for the video elementary stream and PIDs 0102 and 0103 for two audio streams for program 10. Similarly, a second PMT 142 defines a PID=0201 for the video elementary stream and PIDs 0202 and 0203 for two audio streams for program 20.

As previously noted, the two primary commercial providers of cable head end encryption and modulation equipment are (at this writing) Motorola, Inc. and Scientific-Atlanta, Inc. While similar in operation, there are significant differences that should be discussed before proceeding since the present selective encryption encoder 114 is desirably compatible with either system. In the case of Motorola equipment, the Integrated Receiver Transcoder (IRT), an unmodulated output is available and therefore there is no need to demodulate the output before returning a signal to the selective encryption encoder 114, whereas no such unmodulated output is available in a Scientific-Atlanta device. Also, in the case of current Scientific-Atlanta equipment, the QAM, the primary encryption encoder carries out a PID remapping function on received packets. Thus, provisions are made in the selective encryption encoder 114 to address this remapping.

In addition to the above processing, the Program Specific Information (PSI) is also modified to reflect this processing. The original, incoming Program Association Table (PAT) is appended with additional Program Map Table (PMT) entries at a PMT inserter 134. Each added PMT entry contains the new, additional streams (remapped & shadow PIDs) created as part of the selective encryption (SE) encoding process for a corresponding stream in a PMT of the incoming transport. These new PMT entries will mirror their corresponding original PMTs. The program numbers will be automatically assigned by the selective encryption encoder 114 based upon open, available program numbers as observed from the program number usage in the incoming stream. The selective encryption System 114 system displays the inserted program information (program numbers, etc) on the configuration user interface of control computer 118 so that the Multiple System Operator (MSO, e.g., the cable system operator) can add these extra programs into the System Information (SI) control system and instruct the system to carry these programs in the clear.

Figure 3:
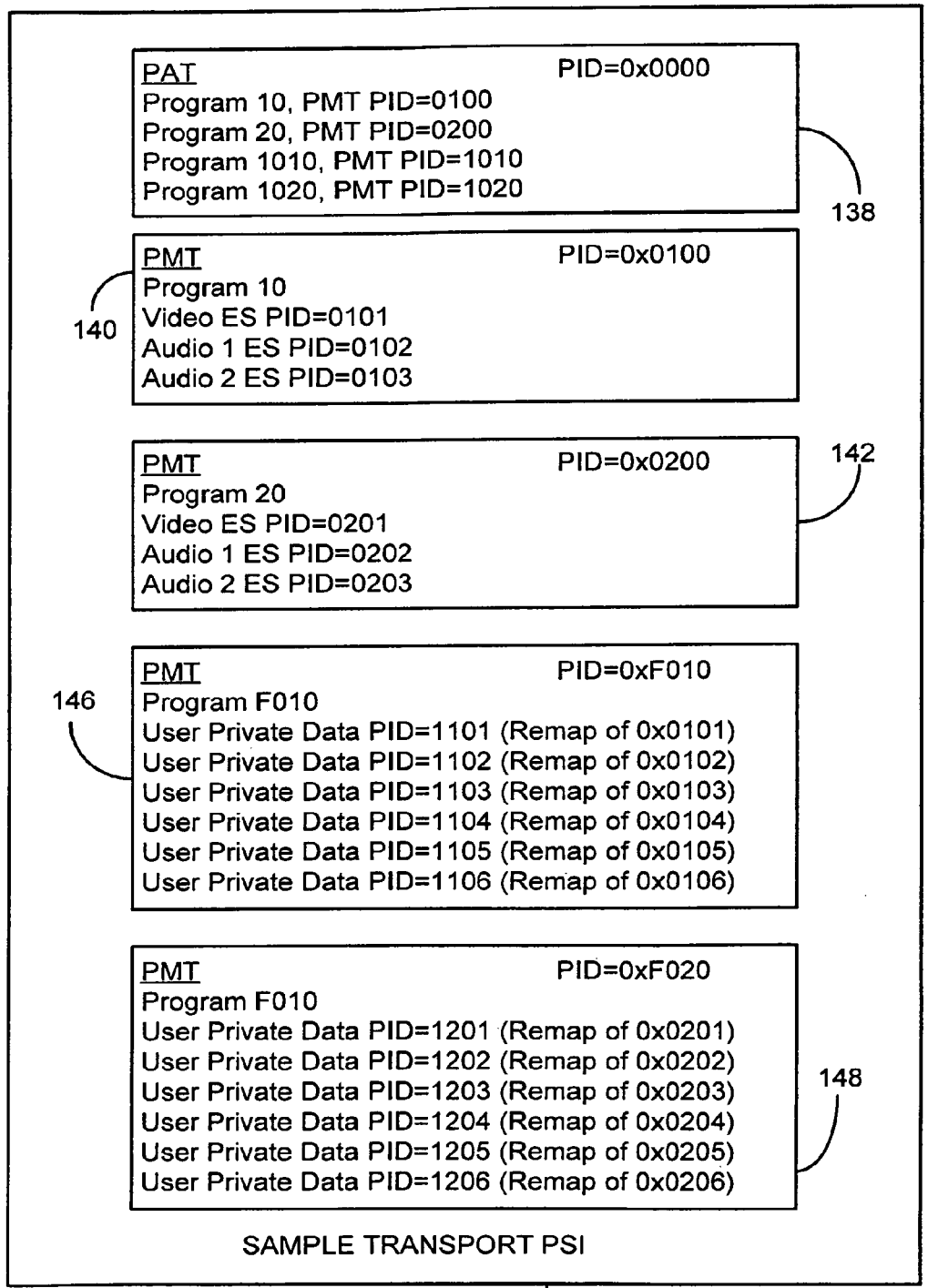
FIG. 3 is a further illustration of sample transport stream PSI consistent with certain embodiments of the present invention.

The modified transport PSI is illustrated as 144 in FIG. 3 with two additional temporary PMTs 146 and 148 appended to the tables of transport PSI 136. The appended PMTs 146 and 148 are temporary. They are used for the primary encryption process and are removed in the second pass of processing by the secondary encryption encoder. In accordance with the MPEG standard, all entries in the temporary PMTs are marked with stream type "user private" with an identifier of 0xF0. These PMTs describe the remapping of the PIDs for use in later recovery of the original mapping of the PIDs in the case of a PID remapping in the Scientific-Atlanta equipment. Of course, other identifiers could be used without departing from the present invention.

In order to assure that the Scientific-Atlanta PID remapping issue is addressed, if the selective encryption encoder 114 is configured to operate with a Scientific-Atlanta system, the encoder adds a user private data descriptor to each elementary stream found in the original PMTs in the incoming data transport stream (TS) per the format below (of course, other formats may also be suitable):

| Syntax | value | # of bits |
|---|---|---|
| private_data_indicator_descriptor( ) { | | |
|    descriptor_tag | 0xF0 | 8 |
|    descriptor_length | 0x04 | 8 |
|    private_data_indicator( ) { | | |
|       orig_pid | 0x???? | 16 |
|       stream_type | 0x?? | 8 |
|       reserved | 0xFF | 8 |
|    } | | |
| } | | |

The selective encryption encoder 114 of the current embodiment also adds a user private data descriptor to each elementary stream placed in the temporary PMTs created as described above per the format below:

| Syntax | value | # of bits |
|---|---|---|
| private_data_indicator_descriptor( ) { | | |
|    descriptor_tag | 0xF0 | 8 |
|    descriptor_length | 0x04 | 8 |
|    private_data_indicator( ) { | | |
|       orig_pid | 0x???? | 16 |
|       stream_type | 0x?? | 8 |
|       reserved | 0xFF | 8 |
|    } | | |
| } | | |

The "????" in the tables above is the value of the "orig_pid" which is a variable while the "??" is a "stream_type" value. The data field for "orig_pid" is a variable that contains the original incoming PID or in the case of remap or shadow PIDs, the original PID that this stream was associated with. The data field "stream_type" is a variable that describes the purpose of the stream based upon the chart below:

| Stream Type | Value |
|---|---|
| Legacy ES | 0x00 |
| Remapped ES | 0x01 |
| Shadow ES | 0x02 |
| Reserved | 0x03-0xFF |

These descriptors will be used later to re-associate the legacy elementary streams, which are encrypted by the Scientific-Atlanta, Inc. primary encryption encoder 104, with the corresponding shadow and remapped clear streams after PID remapping in the Scientific-Atlanta, Inc. modulator prior to the second phase of processing of the Selective Encryption Encoder. Those skilled in the art will appreciate that the above specific values should be considered exemplary and other specific values could be used without departing from the present invention.

In the case of a Motorola cable system being selected in the selective encryption encoder configuration GUI, the original PAT and PMTs can remain unmodified, providing the system does not remap PIDs within the primary encryption encoder. The asterisks in FIG. 1 indicate functional blocks that are not used in a Motorola cable system.

The data stream from selective encryption encoder 114 is passed along to the input of the primary encryption encoder 104 which first carries out a PID filtering process at 150 to identify packets that are to be encrypted. At 152, in the case of a Scientific-Atlanta device, a PID remapping may be carried out. The data are then passed along to an encrypter 154 that, based upon the PID of the packets encrypts certain packets (in accord with the present invention, these packets are the special packets which are mapped by the PID Remapper 130 to the original PID of the incoming data stream for the current program). The remaining packets are unencrypted. The data then passes through a PSI modifier 156 that modifies the PSI data to reflect changes made at the PID remapper. The data stream is then modulated by a quadrature amplitude modulation (QAM) modulator 158 (in the case of the Scientific-Atlanta device) and passed to the output thereof. This modulated signal is then demodulated by a QAM demodulator 160. The output of the demodulator 160 is directed back to the selective encryption encoder 114 to a PSI parser 164.

The second phase of processing of the transport stream for selective encryption is to recover the stream after the legacy encryption process is carried out in the primary encryption encoder 104. The incoming Program Specific Information (PSI) is parsed at 164 to determine the PIDs of the individual elementary streams and their function for each program, based upon the descriptors attached in the first phase of processing. This allows for the possibility of PID remapping, as seen in Scientific-Atlanta primary encryption encoders. The elementary streams described in the original program PMTs are located at PSI parser 164 where these streams have been reduced to just the selected packets of interest and encrypted in the legacy CA system format in accord with the primary encryption method at encoder 104. The elementary streams in the temporary programs appended to the original PSI are also recovered at elementary stream concatenator 168. The packets in the legacy streams are appended to the remapped content, which is again remapped back to the PID of the legacy streams, completing the partial, selective encryption of the original elementary streams.

The temporary PMTs and the associated PAT entries are discarded and removed from the PSI. The user private data descriptors added in the first phase of processing are also removed from the remaining original program PMTs in the PSI. For a Motorola system, no PMT or PAT reprocessing is required and only the final secondary encryption of the transport stream occurs.

During the second phase of processing, the SE encoder 114 creates a shadow PSI structure that parallels the original MPEG PSI, for example, having at PAT origin at PID 0x0000. The shadow PAT will be located at a PID specified in the SE encoder configuration as indicated by the MSO from the user interface. The shadow PMT PIDs will be automatically assigned by the SE encoder 114 dynamically, based upon open, available PID locations as observed from PID usage of the incoming stream. The PMTs are duplicates of the original PMTs, but also have CA descriptors added to the entire PMT or to the elementary streams referenced within to indicate the standard CA parameters and optionally, shadow PID and the intended operation upon the associated elementary stream. The CA descriptor can appear in the descriptor1( ) or descriptor2( ) loops of the shadow PMT. If found in descriptor1( ), the CA_PID called out in the CA descriptor contains the non-legacy ECM PID which would apply to an entire program. Alternatively, the ECM PID may be sent in descriptor2( ). The CA descriptor should not reference the selective encryption elementary PID in the descriptor1( ) area.

| CA PID Definition | Secondary CA private data Value |
|---|---|
| ECM PID | 0x00 |
| Replacement PID | 0x01 |
| Insertion PID | 0x02 |
| ECM PID | undefined (default) |

This shadow PSI insertion occurs regardless of whether the selective encryption operation is for a Motorola or Scientific Atlanta cable network. The elementary streams containing the duplicated packets of interest that were also assigned to the temporary PMTs are encrypted during this second phase of operation at secondary packet encrypter in the secondary CA format based upon the configuration data of the CA system attached using the DVB (Digital Video Broadcasting) Simulcrypt™ standard.

The data stream including the clear data, primary encrypted data, secondary encrypted data and other information are then passed to a PSI modifier 176 that modifies the transport PSI information by deletion of the temporary PMT tables and incorporation of remapping as described above. The output of the PSI modifier 176 is modulated at a QAM modulator 180 and delivered to the cable plant 184 for distribution to the cable system's customers.

Figure 4:
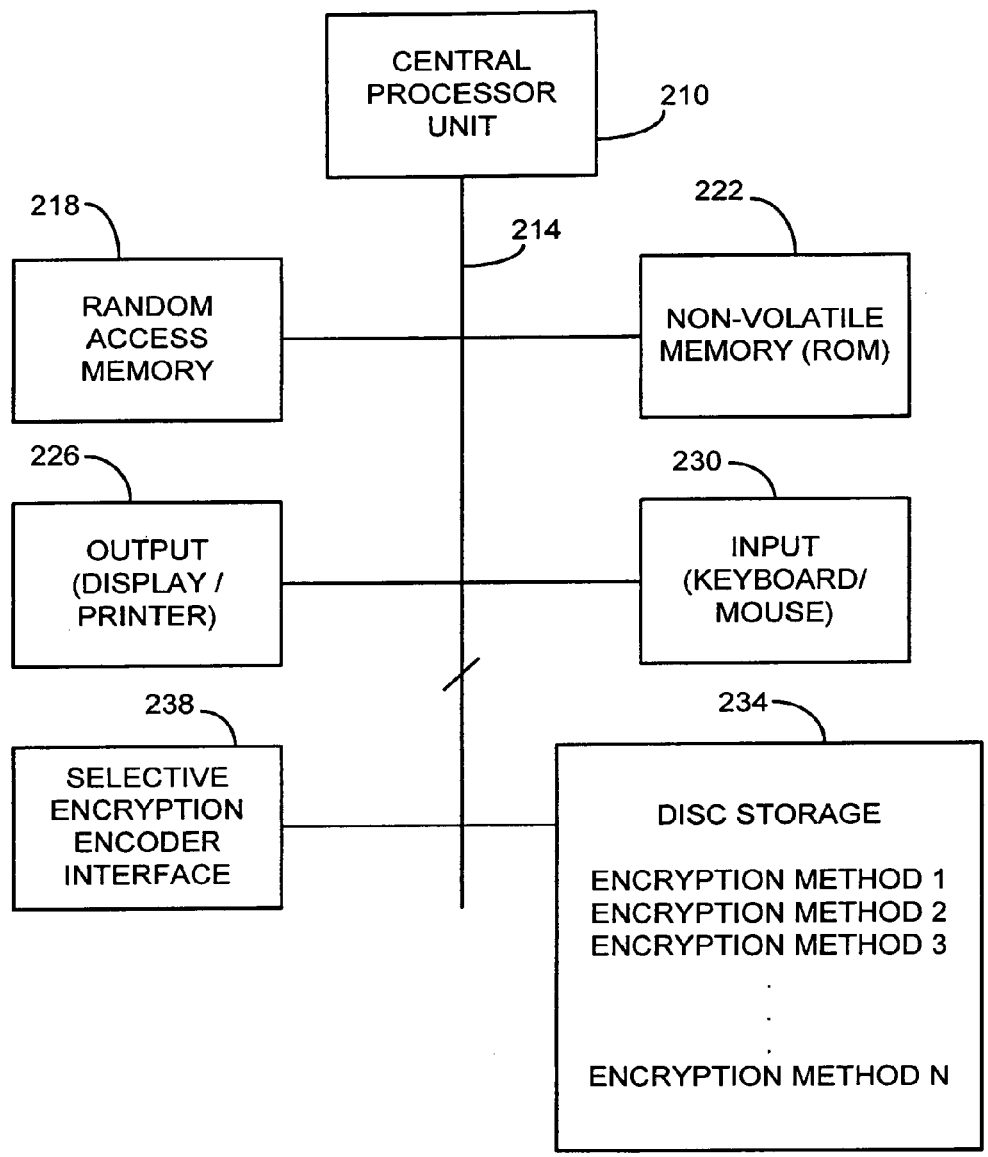
FIG. 4 is a block diagram of an illustrative control processor 100 consistent with certain embodiments of the present invention.

The control processor 100 may be a personal computer based device that is used to control the selective encryption encoder as described herein. An exemplary personal computer based controller 100 is depicted in FIG. 4. Control processor 100 has a central processor unit (CPU) 210 with an associated bus 214 used to connect the central processor unit 210 to Random Access Memory 218 and Non-Volatile Memory 222 in a known manner. An output mechanism at 226, such as a display and possibly printer, is provided in order to display and/or print output for the computer user as well as to provide a user interface such as a Graphical User Interface (GUI). Similarly, input devices such as keyboard and mouse 230 may be provided for the input of information by the user at the MSO. Computer 100 also may have disc storage 234 for storing large amounts of information including, but not limited to, program files and data files. Computer system 100 also has an interface 238 for connection to the selective encryption encoder 114. Disc storage 234 can store any number of encryption methods that can be downloaded as desired by the MSO to vary the encryption on a regular basis to thwart hackers. Moreover, the encryption methods can be varied according to other criteria such as availability of bandwidth and required level of security.

The partial encryption process described above utilizes any suitable conditional access encryption method at encrypters 154 and 174. However, these encryption techniques are selectively applied to the data stream using a technique such as those described below or in the above-referenced patent applications. In general, but without the intent to be limiting, the selective encryption process utilizes intelligent selection of information to encrypt so that the entire program does not have to undergo dual encryption. By appropriate selection of appropriate data to encrypt, the program material can be effectively scrambled and hidden from those who desire to hack into the system and illegally recover commercial content without paying. The MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data.

In accordance with certain embodiments of the present invention, a method of dual encrypting a digital video signal involves examining unencrypted packets of data in the digital video signal to identify at least one specified packet type, the specified packet type comprising packets of data as will be described hereinafter; encrypting packets identified as being of the specified packet type using a first encryption method to produce first encrypted packets; encrypting the packets identified as being of the specified packet type using a second encryption method to produce second encrypted packets; and replacing the unencrypted packets of the specified packet type with the first encrypted packets and the second encrypted packets in the digital video signal to produce a partially dual encrypted video signal.

The MPEG specification defines a slice as " . . . a series of an arbitrary number of consecutive macroblocks. The first and last macroblocks of a slice shall not be skipped macroblocks. Every slice shall contain at least one macroblock. Slices shall not overlap. The position of slices may change from picture to picture. The first and last macroblock of a slice shall be in the same horizontal row of macroblocks. Slices shall occur in the bitstream in the order in which they are encountered, starting at the upper-left of the picture and proceeding by raster-scan order from left to right and top to bottom . . . ."

By way of example, to represent an entire frame of NTSC information, for standard resolution, the frame (picture) is divided into 30 slices (but in general j slices may make up a full frame). Each slice contains 33 variable length macroblocks (but in general can include k variable length macroblocks) of information representing a 16×16 pixel region of the image. This is illustrated as standard definition frame 250 of FIG. 5 with each slice starting with a slice header (SH1-SH30) and each slice having 33 macroblocks (MB1-MB33). By appropriate selection of particular data representing the frame, the image can be scrambled beyond recognition in a number of ways as will be described below. By variation of the selection criteria for selective encryption, hackers can be thwarted on a continuing basis. Moreover, the selection criteria can be changed to adapt to bandwidth requirements as well as need for security of particular content (or other criteria).

Several techniques are described below for encryption of the selected data. In each case, for the current embodiment, it will be understood that selection of a particular type of information implies that the payload of a packet carrying such data is encrypted. However, in other environments, the data itself can be directly encrypted. Those skilled in the art will appreciate that such variations as well as others are possible without departing from the present invention. Moreover, those skilled in the art will appreciate that many variations and combinations of the encryption techniques described hereinafter can be devised and used singularly or in combination without departing from the present invention.

Slice Header Encryption

FIG. 6 illustrates a encryption of the slice headers for all of the slices of the frame 254. In this illustration, the diagonal cross-hatching is intended to represent encrypted information. By encryption of a slice header, the corresponding slice cannot be properly displayed. Moreover, a relatively low amount of bandwidth is required in a dual encryption scenario for encryption of packets with secondary PIDs when the encrypted packets are those containing the slice header. As a practical matter, encryption of a packet containing the slice header likely involves encryption of additional information including at least a portion of the first macroblock following each slice header, rendering the slice all the more difficult to decode. Such a scheme involves encryption of less than about 2 percent of the data and is thus quite practical to implement with little impact on bandwidth. However, since such a scheme leaves certain anchor data transmitted in the clear, it is potentially subject to attack.

Slice Header and First Macroblock Encryption

Security can be further enhanced if in addition to the slice header, the first macroblock is encrypted in each slice. This is depicted in FIG. 7 as frame 258, again with the encrypted information shown with diagonal cross-hatch marks. Since the first macroblock of each slice contains anchor data in the form of absolute chrominance and luminance values, encryption of the first macroblock of each slice reduces the amount of absolute data available to a hacker to work backwards from in order to decypher the image. Using this technique adds little to the overhead of encryption of slice headers alone and results in encryption of only about 2 percent of the total data. Owing to the variable length of the macroblocks, somewhat more data may be encrypted according to this scheme, since a packet may carry portions of multiple macroblocks.

Those skilled in the art will also appreciate that the first macroblock of each slice can also be encrypted without encryption of the slice headers to distort the video. This is also a viable encryption scheme.

Active Region Encryption

Another technique providing a suitable tradeoff between bandwidth and encryption security involves encryption of selected portions of the frame which can be deemed the "active region" of the image. This region is somewhat difficult to define and is somewhat content dependent. But, generally speaking it is approximately a central area of the frame. More commonly, it is approximately an upper central portion of the frame of approximately half (say, one third to ¾) of the overall area of the frame centered at approximately the center of the frame horizontally and approximately the tenth to fifteenth slice. According to its broadest definition, the active region of the image is made up of the centralized portion of a frame with at least one slice bounding the upper and lower region of the frame. One embodiment of this region is depicted in frame 262 of FIG. 8, as region 266.

Owing to the variable size of the macroblocks in each frame, encryption of an active area as described suggests that a varying number of packets in each slice might require encryption (assuming packetizing of the macroblocks) and a scenario wherein more actual data than that illustrated in FIG. 8 will actually undergo encryption. This is illustrated in FIG. 9 in which each slice of frame 270 is depicted as encompassing a varying number of packets such as packet 272. Moreover, the actual starting and ending point of the packet varies due to the variation in size of the macroblocks. Depending upon the actual definition of the active region, the overhead required for dual encryption of frames such as those described above, will also vary. (Note that for illustrative purposes, the packets are depicted as variable in length and the macroblocks fixed in length, whereas, the opposite is actually the case)

In this encryption technique, the active portion of the screen is deemed to be the area of most interest to the viewer. Although some intelligible video information is present, it is likely to at least be an annoyance to an unauthorized viewer. In combination with other techniques, this can be a useful variation in the available encryption techniques.

Active Slice Encryption

FIG. 10 depicts a frame 274 that has all slices in an active region encrypted. Under the broadest definition of "active region" above, this type of encryption is a subcategory of the active region encryption method. In this embodiment, slices 6 through 23 are encrypted, but other regions of slices could equally well be defined as the central or active region and encrypted as shown. Again, this technique, when used alone, will permit substantial information to be transmitted in the clear and possibly provide clear images at the upper and lower portions of a frame. Encryption of the active slices can be accomplished in any number of ways including, but not limited to, encryption of the slice headers alone or in combination with the first macroblocks of the active slices as well as full encryption of all data in the active slices.

Encryption of Anchor Data

Anchor data appears in the data stream at various times to provide absolute luminance and chrominance information. This is normally carried out in an MPEG system using an I Frame. However, some encoders (e.g., those produced by Motorola, Inc.) use P Frames to encode progressively refreshed intracoded slices. Such systems often refresh three consecutive slices in a P Frame with the following three slices refreshed in the next P Frame. Thus a full refresh takes 30 frames and requires about one second to accomplish. The most important motion vectors to encrypt appear to be those that occur immediately after a refresh of anchor data. Encryption of such anchor data (I Frames or P Frames in a progressive refreshed system) will cause data that follows the anchor data to be rendered useless since it contains no reference point from which to adjust the picture.

Encryption of Motion Vectors after Anchor Data

A number of theoretical attacks against proposed SE encryption schemes recover information that may be encrypted by the intracoded slice headers. The information encrypted could be the DC absolute values for luminance and/or chrominance. For example, clear intracoded macroblocks sent in previous frames or in adjoining slices might be used to recover the DC absolute values for the macroblocks with that information encrypted (through some type of correlation). Other methods use a minimum/maximum differential technique to derive the DC absolute value without any need for clear intracoded macroblocks. An encryption technique that might be more immune to this type of attack is described below.

As previously described, motion vectors are used to describe the movement of blocks or macroblocks of information within the image. Motion compensation displaces macroblocks from previous pictures. Macroblock predictions are formed out of arbitrary 16×16 pixel (or 16×8 in MPEG-2) areas from previously reconstructed pictures. There are no boundaries which limit the location of a macroblock prediction within the previous picture. In accordance with certain embodiments consistent with the present invention, consider encryption of the first macroblock in non-intracoded slices (slices without all intracoded macroblocks).

The most critical motion vectors to encrypt appear to be those appearing right after a "refresh" either with an I Frame or a P Frame. These motion vectors most typically are sent in a B or P frame. Since B frames are not referenced by other frames, a maximal destructive effect is achieved by encrypting the motion vectors in the subsequent P frame after an I Frame or P Frame. There are two types of refresh mechanisms currently employed by content encoders in the content community. Traditional encoders use I frames, while Motorola encoders use P frames with progressively refreshed intracoded slices.

It may be possible to skip encryption for some of the motion vectors, and still achieve a destructive effect. For example, the motion vectors after every other I frame could be encrypted and still affect the image to a large extent . . . making it unwatchable. For HITS (Headend In The Sky) streams, every other P frame could be skipped. However, it would be beneficial to lap the encryption so that every slice is affected at least once approximately every two seconds. For HITS, it may be possible to encrypt two out of the three or one out of the three slices after a refresh swath.

Motion vectors are differentially coded from the previous macroblock except in the following instances:
1) Start of a slice;
2) An intra macroblock;
3) Non-intracoded macroblock which has motion_forward=0; and
4) A macroblock is skipped.

Certain embodiments consistent with the present invention covers case 1) above at all times. In other embodiments, cases 2), 3) and 4) can be recognized by encrypting the macroblock that comes after the start of a slice (with absolute motion vectors).

Encryption of Slices with Intra_Slice_Flag or Intra_Slice Set

The slice header has syntax described by the table below:

| Slice( ) { | No. of bits | Mnemonic |
|---|---|---|
| slice_start_code | 32 | bslbf |
| If (vertical_size>28000 | | |
| slice_vertical_position_extension | 3 | uimsbf |
| if(<sequence_scalable_extension ( ) is present in bitstream>){ | | |
| if (scalable_mode === "data partitioning") | | |
| priority_breakpoint | 7 | uimsbf |
| } | | |
| quantizer_scale_code | 5 | uimsbf |
| if (nextbits( ) =='1'){ | | |
| intra_slice_flag | 1 | bslbf |
| intra_slice | 1 | uimsbf |
| reserved_bits | 7 | uimsbf |
| while (nextbits( ) =='1' { | | |
| extra_bit_slice /* with value of '1' */ | 1 | uimsbf |
| extra_slice_information | 8 | uimsbf |
| } | | |
| } | | |
| extra_bit_slice /* with value of '0' */ | | |
| do { | | |
| macroblock( ) | | |
| } while (nextbits( )!='000 0000 0000 0000 0000 0000') | | |
| next_start_code( ) | | |
| } | | |

Slices with all intra-coded macroblocks have the intra_slice indicator set to 1. This flag may be used to signal slices with intra-coded macroblocks which would not only be sent with I Frames, but also with "progressive refresh" P Frames (where a certain number of slices are sent with all intra-coded macroblocks). The intra_slice_flag set to "1" may be used to flag slices with any portion of intra-coded macroblocks, and might be used to completely eliminate decoding of any intra-coded macroblocks.

For applications in cable television systems, there are primarily two types of streams to consider, the Motorola DigiCipher™ streams and Divcom™ streams. DigiCipher™ streams do not use I Frames and are of the progressive refresh P Frame type. Divcom™ streams use conventional MPEG I Frames. In progressive refresh streams, a selected number of slices (e.g., three out of thirty) are sent as completely intra-coded macroblocks. In I Frames, all slices are sent completely intra-coded macroblocks. In each case, these intra-coded macroblocks serve to carry "anchor data" for motion compensation vectors and other compression techniques which are signaled in other frames. If this anchor data are encrypted, then all the data that references it is useless. In both cases, the intra_slice_flag and the intra_slice indicator are set to "1". Thus, by encrypting packets containing slice headers with set intra_slice_flags and/or intra_slice indicators, key anchor data can be encrypted.

Encryption of Intra-Coded Macroblocks

The previous technique provides one technique for detection of intra-coded macroblocks. However, any technique that detects macroblocks containing intra-coded data can be used as a selection criterion for selecting data or data packets containing key anchor data for encryption.

Encryption of Slices with Multiple Intra-Coded Macroblocks

If a slice contains multiple intra-coded macroblocks, this may be used in another technique as the selection criterion for selection of information to be encrypted. Slices which contain multiple intra-coded macroblocks are indicative that the slice contains significant amounts of anchor data.

Combined Encryption Techniques

Multiple combinations of the above techniques are possible to produce encryption that has varying bandwidth requirements, varying levels of security and varying complexity. Several examples of these combinations, without limitation to those specifically mentioned are:

Packets containing slice headers, first macroblocks following slice headers or intra_coded data appearing within a specifically defined active region of the image.

All packets containing either I Frame data or P Frame data following the I Frame within the active region of the image.

All packets containing either I Frame data or slice header data.

All packets containing data in the active region of the image plus all packets containing slice headers.

Numerous other combinations of the above encryption techniques as well as those described in the above-referenced patent applications and other partial encryption techniques can be combined to produce a rich pallette of encryption techniques from which to select. In accordance with certain embodiments of the present invention, a selection of packets to encrypt can be made by the control computer 118 in order to balance encryption security with bandwidth and in order to shift the encryption technique from time to time to thwart hackers.

Figure 11:
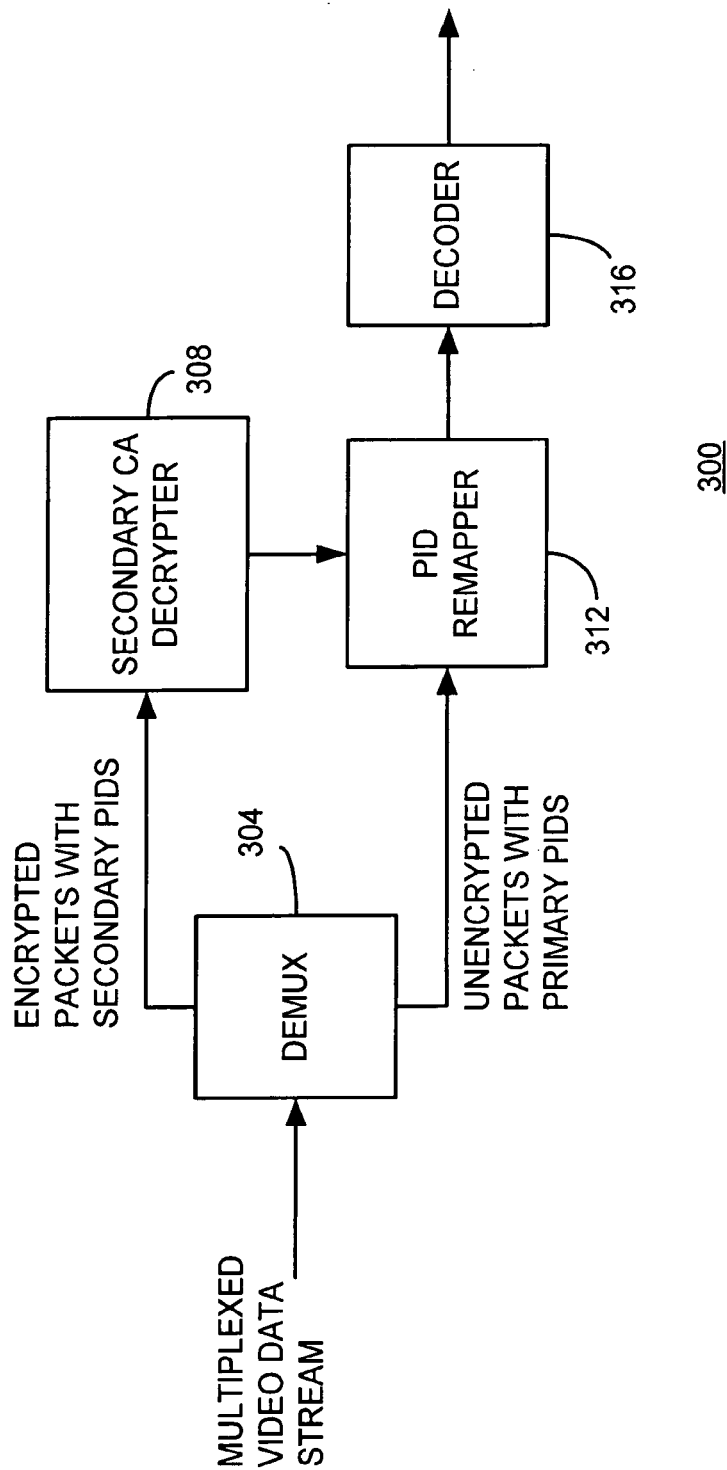
FIG. 11 illustrates a television Set-top box that decrypts and decodes in a manner consistent with certain embodiments of the present invention.

An authorized set-top box such as 300 illustrated in FIG. 11 operating under the secondary CA system decrypts and decodes the incoming program by recognizing both primary and secondary PIDs associated with a single program. The multiplexed video data stream containing both PIDs is directed to a demultiplexer 304. When a program is received that contains encrypted content that was encrypted by any of the above techniques, the demultiplexer directs encrypted packets containing encrypted content and secondary PIDS to a secondary CA decrypter 308. These packets are then decrypted at 308 and passed to a PID remapper 312. As illustrated, the PID remapper 312 receives packets that are unencrypted and bear the primary PID as well as the decrypted packets having the secondary PID. The PID remapper 312 combines the decrypted packets from decrypter 308 with the unencrypted packets having the primary PID to produce an unencrypted data stream representing the desired program. PID remapping is used to change either the primary or secondary PID or both to a single PID. This unencrypted data stream can then be decoded normally by decoder 316. Some or all of the components depicted in FIG. 11 can be implemented and/or controlled as program code running on a programmed processor, with the code being stored on an electronic storage medium.

Figure 12:
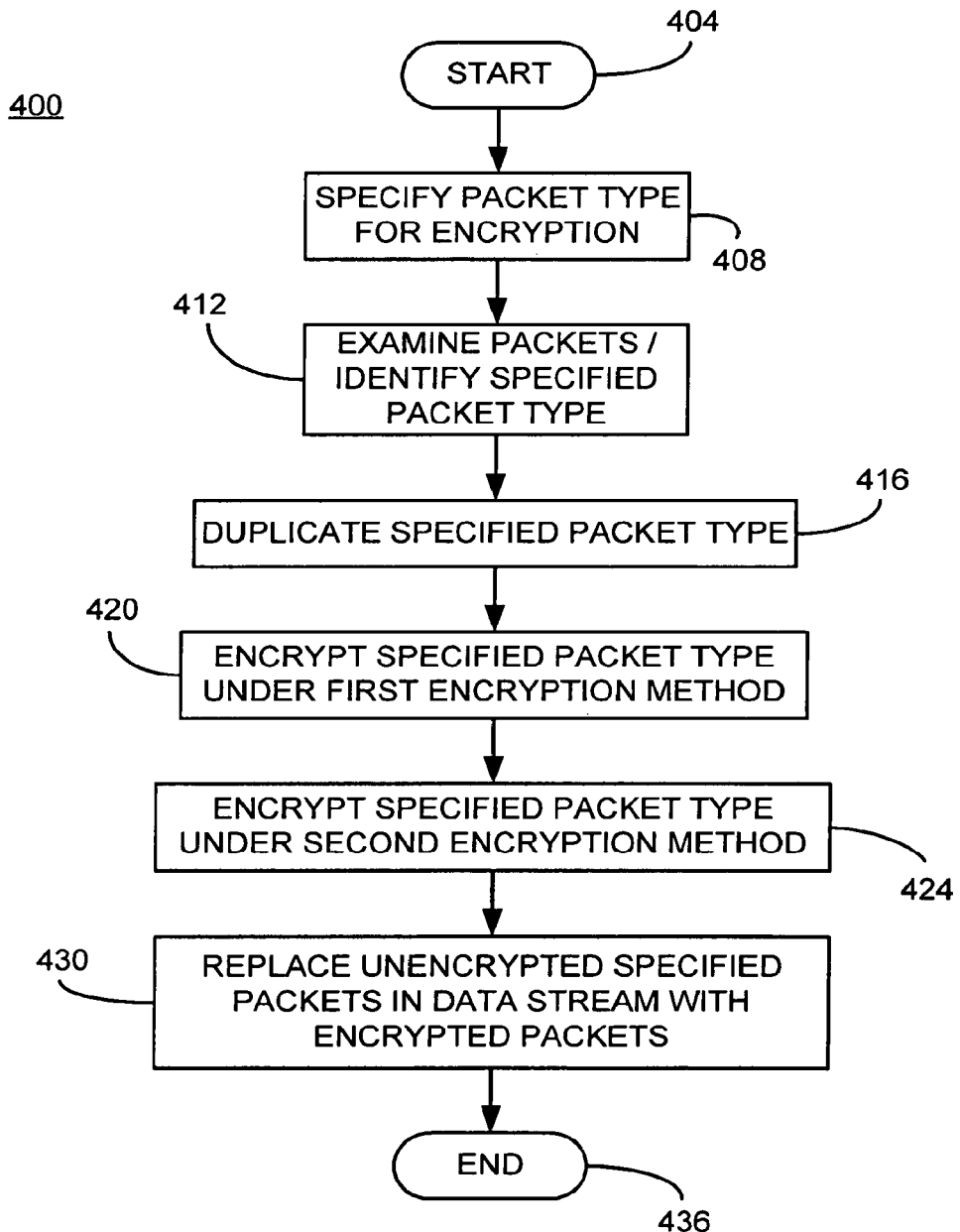
FIG. 12 is a flow chart broadly illustrating an encryption process consistent with embodiments of the present invention.

FIG. 12 is a flow chart 400 that broadly illustrates the encryption process consistent with certain embodiments of the present invention starting at 404. At 408 the packet type that is to be encrypted is specified. In accordance with certain embodiments consistent with the present invention, the selected packet type may be any individual one or combination of the following: packets containing a video slice header appearing in an active region of a video frame, any packet carrying data representing an active region of a video frame, I Frame packets, packets containing motion vectors in a first P frame following an I Frame, packets having an intra_slice_flag indicator set, packets having an intra_slice indicator set, packets containing an intra_coded macroblock, packets that carry data for a slice containing an intra_coded macroblock, packets containing data from a first macroblock following the video slice header, packets containing video slice headers, packets containing anchor data, and P Frame packets for progressively refreshed video data. Packets are then examined at 412 to identify packets of the specified type. At 416, the identified packets are duplicated and at 420 one set of these packets is encrypted under a first encryption method. The other set of identified packets is encrypted at 424 under a second encryption method. The originally identified packets are then replaced in the data stream with the two sets of encrypted packets at 430 and the process ends at 436.

While the above embodiments describe encryption of packets containing the selected data type, it is also possible to encrypt the raw data prior to packetizing without departing from this invention and such encryption is considered equivalent thereto.

Those skilled in the art will recognize that the present invention has been described in terms of exemplary embodiments based upon use of a programmed processor (e.g., processor 118, processors implementing any or all of the elements of 114 or implementing any or all of the elements of 300). However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television set-top box, comprising:
a receiver configured to receive a digital television signal comprising:
a plurality of unencrypted video packets; and
a plurality of encrypted video packets, where the encrypted video packets comprise less than 100% of the packets carrying video data in a video frame, and where the encrypted video packets contain data describing an active region of the video frame, where the active region comprises between approximately ⅓ to ¾ of the overall area of the video frame;
a decrypter that is configured to decrypt the encrypted video packets; and
a decoder that is configured to decode the unencrypted video packets and the decrypted video packets to produce a signal suitable for display play on a television display.

2. The television set-top box according to claim 1, where the active region comprises a central portion of the video frame.

3. The television set-top box according to claim 1, where the active region comprises an upper central portion of the video frame.

4. The television set-top box according to claim 1, where the active region is centered at approximately a center of the frame horizontally and approximately the tenth to fifteenth slice.

5. The television set-top box according to claim 1, where the unencrypted packets and the encrypted packets are identified by different packet identifiers (PID).

6. The television set-top box according to claim 1, where the unencrypted packets and the encrypted packets are identified by the same packet identifier (PID).

7. The television set-top box according to claim 3, where the unencrypted packets and the encrypted packets are identified by the same packet identifier (PID).

8. A television receiver device, comprising:
   a receiver configured to receive a digital television signal comprising:
   a plurality of unencrypted video packets; and
   a plurality of encrypted video packets, where the encrypted video packets comprise less than 100% of the packets carrying video data in a video frame, and where the encrypted video packets contain data describing an active region of the video frame, where the active region comprises between approximately ⅓ to ¾ of the overall area of the video frame;
   a decrypter that is configured to decrypt the encrypted video packets; and
   a decoder that is configured to decode the unencrypted video packets and the decrypted video packets to produce a signal suitable for display play on a television display.

9. The television receiver device according to claim 8, where the active region comprises a central portion of the video frame.

10. The television receiver device according to claim 8, where the active region comprises an upper central portion of the video frame.

11. The television receiver device according to claim 8, where the active region is centered at approximately a center of the frame horizontally and approximately the tenth to fifteenth slice.

12. The television receiver device according to claim 8, where the unencrypted packets and the encrypted packets are identified by different packet identifiers (PID).

13. The television receiver device according to claim 8, where the unencrypted packets and the encrypted packets are identified by the same packet identifier (PID).

14. The television receiver device according to claim 10, where the unencrypted packets and the encrypted packets are identified by different packet identifiers (PID).

15. The television receiver device according to claim 10, where the unencrypted packets and the encrypted packets are identified by the same packet identifier (PID).

16. A television set-top box, comprising:
   a receiver configured to receive a digital television signal comprising:
   a plurality of unencrypted video packets; and
   a plurality of encrypted video packets, where the encrypted video packets comprise less than 100% of the packets carrying video data in a video frame, and where the encrypted video packets contain data describing an active region of the video frame;
   where the active region comprises an upper central portion of the video frame that occupies between approximately ⅓ and ¾ of the overall area of the video frame;
   a decrypter configured to decrypt the encrypted video packets;
   a decoder configured to decode the unencrypted video packets and the decrypted video packets to produce a signal suitable for display play on a television display; and
   where the unencrypted packets and the encrypted packets are identified by packet identifiers (PID).

17. The television set-top box according to claim 16, where the unencrypted packets and the encrypted packets are identified by different packet identifiers (PID).

18. A television set-top box, comprising:
   a receiver configured to receive a digital television signal comprising:
   a plurality of unencrypted video packets; and
   a plurality of encrypted video packets, where the encrypted video packets comprise less than 100% of the packets carrying video data in a video frame, and where the encrypted video packets contain data describing an active region of the video frame, where the active region is centered at approximately a center of the frame horizontally and approximately the tenth to fifteenth slice;
   a decrypter configured to decrypt the encrypted video packets; and
   a decoder configured to decode the unencrypted video packets and the decrypted video packets to produce a signal suitable for display play on a television display.

19. The television set-top box according to claim 18, where the active region comprises a central portion of the video frame.

20. The television set-top box according to claim 18, where the active region comprises an upper central portion of the video frame.

21. The television set-top box according to claim 18, where the unencrypted packets and the encrypted packets are identified by different packet identifiers (PID).

22. The television set-top box according to claim 18, where the unencrypted packets and the encrypted packets are identified by the same packet identifier (PID).

23. A television receiver device, comprising:
   a receiver configured to receive a digital television signal comprising:
   a plurality of unencrypted video packets; and
   a plurality of encrypted video packets, where the encrypted video packets comprise less than 100% of the packets carrying video data in a video frame, and where the encrypted video packets contain data describing an active region of the video frame, where the active region is centered at approximately a center of the frame horizontally and approximately the tenth to fifteenth slice;
   a decrypter configured to decrypt the encrypted video packets; and
   a decoder configured to decode the unencrypted video packets and the decrypted video packets to produce a signal suitable for display play on a television display.

24. The television receiver device according to claim 23, where the active region comprises a central portion of the video frame.

25. The television receiver device according to claim 23, where the active region comprises an upper central portion of the video frame.

26. The television receiver device according to claim 23, where the unencrypted packets and the encrypted packets are identified by different packet identifiers (PID).

27. The television receiver device according to claim 23, where the unencrypted packets and the encrypted packets are identified by the same packet identifier (PID).

* * * * *